United States Patent
Shin et al.

(10) Patent No.: US 7,844,940 B2
(45) Date of Patent: Nov. 30, 2010

(54) MASK SET FOR MICROARRAY, METHOD OF FABRICATING MASK SET, AND METHOD OF FABRICATING MICROARRAY USING MASK SET

(75) Inventors: Jae-pil Shin, Suwon-si (KR); Jin-sook Choi, Suwon-si (KR); Moon-hyun Yoo, Suwon-si (KR); Jong-bae Lee, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 360 days.

(21) Appl. No.: 12/030,663

(22) Filed: Feb. 13, 2008

(65) Prior Publication Data
US 2008/0193864 A1   Aug. 14, 2008

(30) Foreign Application Priority Data
Feb. 13, 2007   (KR) .................... 10-2007-0014896

(51) Int. Cl.
G06F 17/50 (2006.01)
G06F 19/00 (2006.01)
G03F 1/00 (2006.01)
G21K 5/00 (2006.01)

(52) U.S. Cl. .................... 716/21; 700/120; 700/121; 430/5; 378/35

(58) Field of Classification Search ................ 716/21; 700/120, 121; 430/5; 378/35
See application file for complete search history.

(56) References Cited

U.S. PATENT DOCUMENTS

| | | | | |
|---|---|---|---|---|
| 5,340,992 | A * | 8/1994 | Matsugu et al. | 250/548 |
| 5,429,896 | A * | 7/1995 | Hasegawa et al. | 430/5 |
| 5,576,783 | A * | 11/1996 | Lee | 396/322 |
| 2004/0081917 | A1* | 4/2004 | Tanaka et al. | 430/311 |
| 2004/0096840 | A1 | 5/2004 | Tudor et al. | |
| 2004/0191548 | A1* | 9/2004 | Takemoto | 428/483 |
| 2005/0158638 | A1* | 7/2005 | Hasegawa et al. | 430/5 |
| 2005/0216201 | A1 | 9/2005 | Hubbell et al. | |
| 2006/0094040 | A1 | 5/2006 | Hubbell et al. | |

FOREIGN PATENT DOCUMENTS

| | | |
|---|---|---|
| KR | 1020030088773 | 11/2003 |
| KR | 1020030088782 | 11/2003 |
| KR | 1020040044151 | 5/2004 |
| WO | WO 92/10092 | 6/1992 |
| WO | WO 98/27430 | 6/1998 |

OTHER PUBLICATIONS

Ted X. Sun, "Combinatorial Search for Advanced Luminescence Materials.," 1999,John Wiley & Sons, Inc., 1 page.

(Continued)

*Primary Examiner*—Phallaka Kik
(74) *Attorney, Agent, or Firm*—F. Chau & Associates, LLC

(57) ABSTRACT

A mask set with a light-transmitting region of a controlled size includes a plurality of masks for performing in-situ synthesis on probes of a microarray, wherein each mask includes a light-transmitting region and a light-blocking region, and the size of the light-transmitting region is equal to or greater than about 5% of the total size of the light-transmitting and light-blocking regions.

18 Claims, 15 Drawing Sheets

OTHER PUBLICATIONS

Kazunori Takahashii, "A Photochemical/Chemical Direct Method of Synthesizing High-Performance Deoxyribonucleic Acids Chips for Rapid and Parallel Gene Analysis," Sensors and Actuators B; Elsevier Sequoia S.A. Lausanne, CH, vol. 83, No. 1-3, Mar. 15, 2002, 1 page.

A.V. Vasiliskov, "Fabrication of Microarray of Gel-Immobilized Compounds on a Chip by Copolymerization," Biotechniques, Informa LIfe Sciences Publishing, Westborough, MA, US, vol. 27, No. 3, Sep. 1, 1999, 1 page.

International Search Report for EP 08 00 2181, Jun. 12, 2008.

* cited by examiner

MASK SET FOR MICROARRAY, METHOD OF FABRICATING MASK SET, AND METHOD OF FABRICATING MICROARRAY USING MASK SET

This application claims priority from Korean Patent Application No. 10-2007-0014896 filed on Feb. 13, 2007 in the Korean Intellectual Property Office, the contents of which are herein incorporated by reference in their entirety.

BACKGROUND OF THE INVENTION

1. Technical Field

The present disclosure is directed to a mask set, and more particularly, to a mask set for in-situ synthesizing probes of a microarray, a method of fabricating the mask set, and a method of fabricating the microarray using the mask set.

2. Description of the Related Art

Advances in the genome project have revealed genome nucleotide sequences of various organisms. Accordingly, there is a growing interest in microarrays. Microarrays are widely used for gene expression profiling, genotyping, detection of mutations and polymorphisms, such as single nucleotide polymorphisms (SNPs), analysis of proteins and peptides, screening of potential medicine, development and production of new medicine, and the like.

A microarray includes a plurality of probes fixed to a substrate. The probes may be directly fixed to the substrate by spotting or in-situ synthesized using photolithography and then fixed to the substrate. In particular, in-situ synthesis using photolithography is recently drawing attention because it facilitates mass production of microarrays.

A plurality of masks are used for the in-situ synthesis of probes. Each mask includes light-transmitting regions and light-blocking regions. In addition, each mask is allocated any one of a plurality of, e.g., four, probe monomers. If there are four probe monomers, a maximum of four separate masks are required to complete a monomer layer of a probe. If a probe is composed of 25 monomer layers, a maximum of 100 separate masks would be required.

The light-transmitting regions of each mask respectively correspond to probe cells where monomers are to be synthesized. Therefore, the pattern of each mask varies according to the sequence of target probes that are to be synthesized in each probe cell. That is, while light-transmitting regions may occupy an average of, for example, 25% of an entire mask, their proportion in each mask may be far smaller than the average according to the probe sequence of each probe cell. In the extreme case, some masks may have light-transmitting regions which occupy less than 1% thereof. If a proportion of the light-transmitting regions in some masks is excessively small, it is challenging to perform precise patterning during mask fabrication. For example, since the light-transmitting regions are either partially open or closed, light-transmitting regions of a desired size and/or shape cannot be secured. This situation aggravates as microarrays become more integrated.

SUMMARY OF THE INVENTION

Embodiments of the present invention provide a mask set with a controlled proportion of light-transmitting regions.

Embodiments of the present invention also provide a mask layout determination system controlling the proportion of light-transmitting regions of a mask layout.

Embodiments of the present invention also provide a mask layout determination method which controls a proportion of light-transmitting regions of a mask layout.

Embodiments of the present invention also provide a method of fabricating a mask set using each mask layout with a controlled proportion of light-transmitting regions.

Embodiments of the present invention also provide a method of fabricating a microarray using the mask set.

However, the features of the embodiments of the present invention are not restricted to the one set forth herein. The above and other features will become more apparent to one of daily skill in the art to which embodiments of the present invention pertain by referencing a detailed description of the present invention given below.

According to an aspect of the present invention, there is provided a mask set including a plurality of masks performing in-situ synthesis on probes of a microarray, wherein each mask includes light-transmitting regions and light-blocking regions, and a proportion of the light-transmitting regions in each mask is equal to or greater than about 5% of a total proportion of the light-transmitting and light-blocking regions in each mask.

According to another aspect of the present invention, there is provided a mask layout determination system including a pattern determination unit for allocating light-transmitting regions and light-blocking regions to each of a plurality of mask layouts which perform in-situ synthesis on probes of a microarray; a selection unit for selecting any one of the mask layouts; a comparison unit for comparing a proportion of the light-transmitting regions in a selected mask layout with a minimum light-transmitting proportion; and a pattern change unit for exchanging a light-blocking region of the selected mask layout with a light-transmitting region of an unselected mask layout if the proportion of the light-transmitting regions in the selected mask layout is smaller than the minimum light-transmitting proportion.

According to another aspect of the present invention, there is provided a mask layout determination method including allocating light-transmitting regions and light-blocking regions to each of a plurality of mask layouts which perform in-situ synthesis on probes of a microarray; and exchanging a light-blocking region of a mask layout with a light-transmitting region of another mask layout wherein a proportion of the light-transmitting regions in each mask layout is equal to or greater than a minimum light-transmitting proportion.

According to another aspect of the present invention, there is provided a method of fabricating a mask set. The method includes allocating light-transmitting regions and light-blocking regions to each of a plurality of mask layouts which perform in-situ synthesis on probes of a microarray; exchanging a light-blocking region of a mask layout with a light-transmitting region of another mask layout wherein a proportion of the light-transmitting regions in each mask layout is equal to or greater than a minimum light-transmitting proportion; and fabricating a plurality of masks using the mask layouts which include each mask layout whose light-blocking region is exchanged with a light-transmitting region.

According to another aspect of the present invention, there is provided a method of fabricating a microarray. The method includes providing a substrate comprising an array of a plurality of probe cells and having a surface protected by a photolabile protecting group; and performing in-situ synthesis on probes of a microarray using a mask set which comprises a plurality of masks, each comprising light-transmitting regions and light-blocking regions, wherein a proportion of the light-transmitting regions is equal to or greater than about 5% of a total proportion of the light-transmitting and light-blocking regions.

BRIEF DESCRIPTION OF THE DRAWINGS

The above and other features of embodiments of the present invention will become more apparent by describing in detail exemplary embodiments thereof with reference to the attached drawings.

DETAILED DESCRIPTION OF EXEMPLARY EMBODIMENTS

Figure 1:
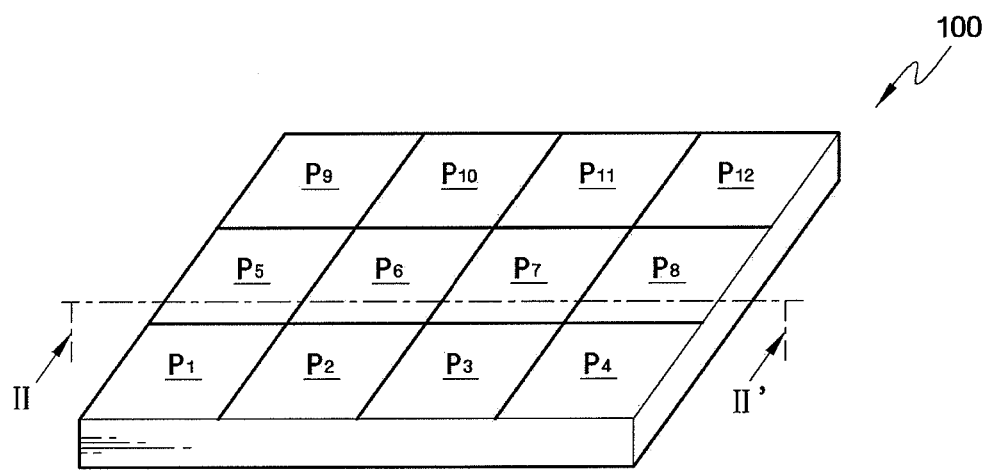
FIG. 1 is a perspective view of a microarray fabricated according to an embodiment of the present invention.

Embodiments of the present invention will now be described more fully with reference to the accompanying drawings, in which exemplary embodiments of the invention are shown. The invention may, however, be embodied in many different forms and should not be construed as being limited to the embodiments set forth herein. Like reference numerals in the drawings denote like elements, and thus their description will be omitted.

Hereinafter, embodiments of the present invention will be described in detail with reference to the accompanying drawings.

Figure 2:
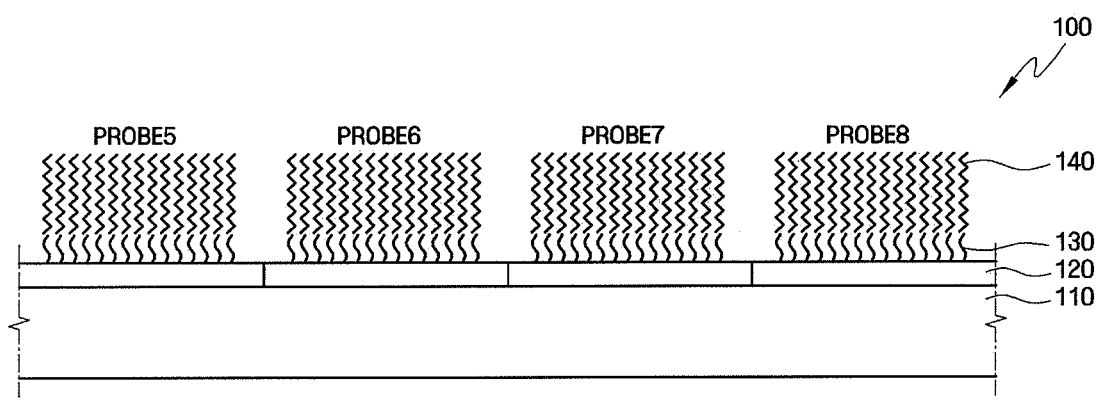
FIG. 2 is a cross-sectional view of the microarray taken along a line II-II' of FIG. 1.

FIG. 1 is a perspective view of a microarray 100 fabricated according to an embodiment of the present invention. FIG. 2 is a cross-sectional view of the microarray 100 taken along a line II-II' of FIG. 1.

Referring to FIGS. 1 and 2, the microarray 100 includes a substrate 110 and a plurality of probes 140. The probes 140 are coupled onto the substrate 110. The microarray 100 may further include a fixing layer 120 and/or a linker 130 between the probes 140 and the substrate 110. The fixing layer 120 and/or the linker 130 couples the probes 140 to the substrate 110.

The substrate 110 may be, for example, a flexible or rigid substrate. An example of a flexible substrate includes a membrane or plastic film such as nylon and nitrocellulose. Examples of a rigid substrate include a silicon substrate and a transparent glass substrate formed of soda lime glass. In the case of the silicon substrate or the transparent glass substrate, non-specific binding rarely occurs during hybridization. In addition, various thin-film fabrication processes and a photolithography process, which are well established and applied to the process of fabricating semiconductor devices or liquid crystal display (LCD) panels, can also be applied to fabricate the silicon substrate or the transparent glass substrate.

The probes 140 may be, for example, oligomer probes. An oligomer is a polymer composed of two or more covalently bonded monomers, and its molecular weight may be approximately 1,000 or less. The oligomer may include approximately 2 through 500 monomers. More specifically, the oligomer may include approximately 5 through 30 monomers. However, the oligomer, which is mentioned in the present invention, is not limited to the above figures, and it encompasses everything that can be called 'oligomer' in the art.

Each monomer of an oligomer probe may be, for example, a nucleoside, a nucleotide, an amino acid, or a peptide.

Each of the nucleosides and nucleotides may include a methylated purine or pyrimidine and an acylated purine or pyrimidine as well as the well-known purine and pyrimidine bases. Examples of the purine and pyrimidine bases may include adenine (A), guanine (G), thymine (T), cytosine (C), and uracil (U). In addition, each of the nucleosides and nucleotides may include ribose and deoxyribose sugar, but also modified sugar obtained by replacing one or more hydroxyl groups with halogen atoms or aliphatic families or by being bonded to functional groups such as ether and amine.

The amino acid may be an L-, D-, or nonchiral amino acid found in nature, a modified amino acid, or an amino acid analog.

The peptide is a compound created by an amino bond between a carboxyl group of an amino acid and an amino group of another amino acid.

Therefore, each of the oligomer probes 140 may be formed of two or more nucleocides, nucleotides, amino acids, or peptides.

Each of the probes 140 may be formed by in-situ synthesis of probe monomers. The in-situ synthesis of the probe monomers may be performed using a mask set which includes a plurality of masks. The masks and the mask set will be described in detail later.

The fixing layer 120 interposed between the substrate 110 and the probes 140 couples the probes 140 to the substrate 110. The fixing layer 120 may be formed of a substantially stable material under a hybridization analysis condition, that is, a material which is not hydrolyzed when contacting phosphate of pH 6-9 or a TRIS buffer. For example, the fixing layer 120 may be formed of a silicon oxide film such as a plasma-enhanced tetraethyl orthosilicate (PE-TEOS) film, a high density plasma (HDP) oxide film, a P—$SiH_4$ oxide film or a thermal oxide film, a silicate such as a hafnium silicate or a zirconium silicate, a metal oxynitride film such as a silicon oxynitride film, a hafnium oxynitride (HfON) film or a zirconium oxynitride film, a metal oxide film such as a titanium oxide film, a tantalum oxide film, an aluminum oxide film, a hafnium oxide film, a zirconium oxide film or an indium tin oxide (ITO) film, metal such as polyimide, polyamine, gold, silver, copper or palladium, or a polymer such as polystyrene, a polyacrylic acid or polyvinyl.

The linker 130 may optionally be interposed between the fixing layer 120 and the probes 140. The linker 130 couples the probes 140 to the fixing layer 120. Therefore, the linker 130 may be formed of a material including a functional group which can be coupled to the fixing layer 120 and a functional group which can be coupled to the probes 140. Furthermore, the linker 130 may provide a spatial margin for hybridization.

To this end, the length of the linker 130 may be, but is not limited to, about 6 through 50 atoms.

The microarray 100 configured as described above includes a plurality of probe cells. For illustrative purposes, an exemplary, non-limiting microarray includes first through twelfth probe cells $P_1$-$P_{12}$. It is to be understood that microarrays according to other embodiments can be configured with a different number of probe cells. Each of the first through twelfth probe cells $P_1$-$P_{12}$ is a segment to which the probes 140 are coupled. Therefore, it may be understood that the first through twelfth probe cells $P_1$-$P_{12}$ include the probes 140 and an object to which the probes 140 are coupled. As described above, the object to which the probes 140 are coupled may be the substrate 110, the fixing layer 120, and/or the linker 130. Therefore, it can be understood that anything referred to as a probe cell includes the object and at least one of the substrate 110, the fixing layer 120, and the linker 130.

The first through twelfth probe cells $P_1$-$P_{12}$ can be distinguished from one another by the sequence of the probes 140 coupled to the fixing layer 120 and/or by physical patterns of the fixing layer 120.

More specifically, probes included in the same probe cell have substantially the same probe sequence. On the other hand, probes included in different probe cells have different probe sequences. Referring to FIG. 2, all probes PROBE 5 included in the fifth probe cell $P_5$ have the same probe sequence. The same applies to probes PROBE 6, PROBE 7, and PROBE 8. However, when it comes to the relationship between the probes PROBE5, PROBE 6, PROBE 7 and PROBE 8, the probes PROBE5, PROBE 6, PROBE 7 and PROBE 8 have different probe sequences since they are included in different probe cells, i.e., the fifth through eighth probe cells $P_5$-$P_8$, respectively. That is, the fifth probe cell $P_5$ including the probes PROBE 5, the sixth probe cell $P_6$ including the probes PROBE 6, the seventh probe cell $P_7$ including the probes PROBE 7, and the eighth probe cell $P_8$ including the probes PROBE 8 sequentially arranged from the left in FIG. 2 may be distinguished from one another by their probe sequences. Similarly, the same applies to the first through fourth probe cells $P_1$-$P_4$ and the ninth through twelfth probe cells $P_9$-$P_{12}$.

Another standard for distinguishing the first through twelfth probe cells $P_1$-$P_{12}$ is a physical pattern. That is, the first through twelfth probe cells $P_1$-$P_{12}$ may be physically patterned, and an isolation region (not shown) may be interposed between them.

As illustrated in FIG. 1, the first through twelfth probe cells $P_1$-$P_{12}$ may be patterns arranged in rows and columns and have substantially the same size and shape.

Figure 3:
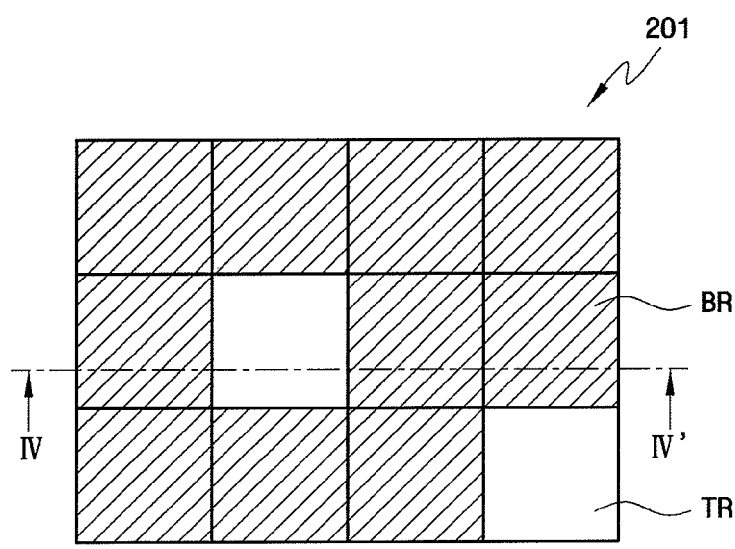
FIG. 3 is a plan view of a mask according to an embodiment of the present invention.
Figure 4:
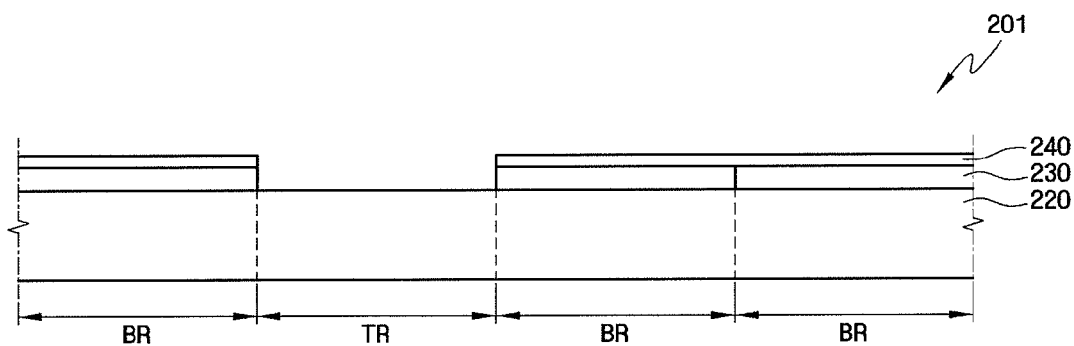
FIG. 4 is a cross-sectional view of the mask taken along a line IV-IV' of FIG. 3.

Hereinafter, a mask used for the in-situ synthesis of the probes 140 in the microarray 100 will be described. FIG. 3 is a plan view of a mask 201 according to an embodiment of the present invention. FIG. 4 is a cross-sectional view of the mask 201 taken along a line IV-IV' of FIG. 3.

Referring to FIG. 3, the mask 201 may be divided into a plurality of segments respectively corresponding to probe cells in a microarray. Each segment is occupied by any one of a light-transmitting region TR and a light-blocking region BR. The total number of light-transmitting regions TR and light-blocking regions BR in the mask 201 is equal to the number of corresponding probe cells regardless of whether the above regions are adjacent to one another. Therefore, in FIG. 3, there are two light-transmitting regions TR and ten light-blocking regions BR.

A cross-sectional structure of the mask 201 will now be described with reference to FIG. 4. The mask 201 includes a base 220 formed of transparent glass, a light-blocking pattern layer 230 partially formed on the base 220 and formed of an opaque material such as chrome, and a reflection preventive pattern layer 240, for example, formed of chrome oxide.

The light-transmitting and light-blocking regions TR and BR of the mask 201 are determined according to whether the light-blocking pattern layer 230 is formed. That is, a region where the light-blocking region 230 is formed is a light-blocking region BR, and a region where the light-blocking region 230 is not formed is a light-transmitting regions TR since the transparent base 220 is exposed.

Figure 5A:
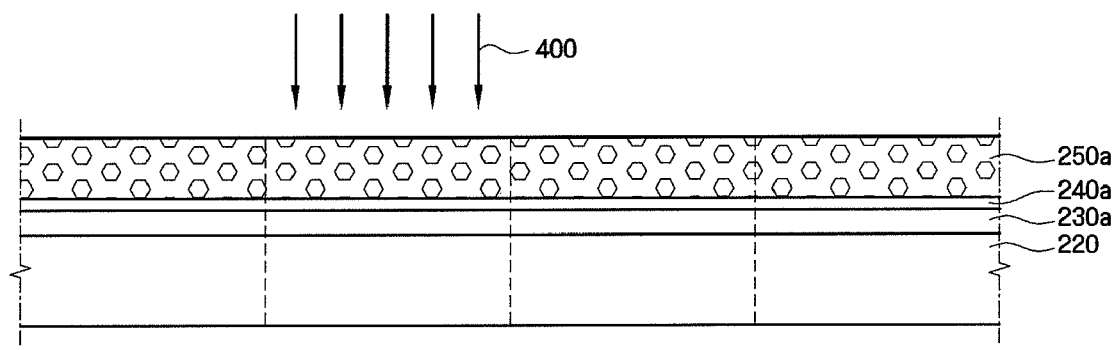
FIGS. 5A through 5C are cross-sectional views for explaining a method of fabricating the mask illustrated in FIG. 4.
Figure 5B:
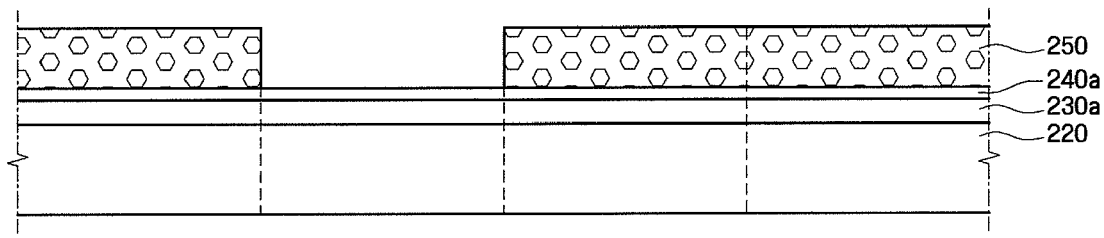
Figure 5C:
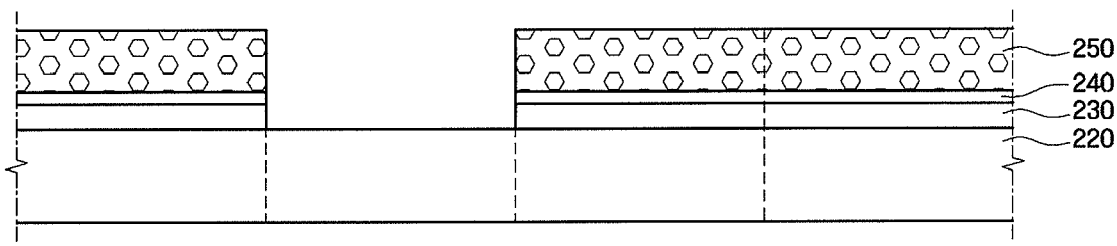

A method of fabricating the mask 201 will now be described with reference to FIGS. 5A through 5C. FIGS. 5A through 5C are cross-sectional views for explaining the method of fabricating the mask 201 illustrated in FIG. 4.

Referring to FIG. 5A, a stack is provided of a light-blocking layer 230a, a reflection preventive layer 240a, and a photoresist film 250a sequentially formed on the base 220. The photoresist film 250a is selectively exposed as indicated by reference numeral 400. Here, a region (hereinafter, referred to as an exposure region) of the photoresist film 250a, which is to be exposed, may be selected based on a mask layout which is prepared in advance.

Referring to FIG. 5B, the selected exposure region of the photoresist film 250a is removed in a photolithography process. Consequently, a photoresist pattern 250 exposing the reflection preventive layer 240a is formed.

Referring to FIG. 5C, the exposed reflection preventive layer 240a and the light-blocking layer 230a beneath the exposed reflection preventive layer 240a are etched. Consequently, the reflection preventive pattern layer 240 and the light-blocking pattern layer 230 are formed, and the substrate 220 thereunder is exposed. The exposed reflection preventive layer 240a and the light-blocking layer 230a may be anisotropically etched.

Next, if the photoresist pattern 250 is removed, the mask 201 illustrated in FIG. 4 can be completed. A region where the reflection preventive layer 240a and the light-blocking layer 230a therebeneath are removed is the light-transmitting region TR.

In the above fabrication process, the selective exposure process 400 of the photoresist film 250a is performed using, for example, electronic beams. In the selective exposure process 400, if the size of the selected exposure region is much smaller than the size of the mask 201, it becomes challenging to perform accurate patterning. For example, when various masks are fabricated using electronic beams having the same dose, if an exposure region is excessively small, it cannot be exposed to a desired exposure dose. In addition, in a developing process, an excessively small exposure region hinders precise development. Consequently, the reliability of mask patterns, i.e., the light-transmitting and light-blocking regions TR and BR, is reduced. Therefore, the light-transmitting regions TR may account for an appropriate proportion of the mask patterns fabricated. For example, a proportion of the light-transmitting regions in the mask patterns may be greater than a minimum light-transmitting proportion.

The minimum light-transmitting proportion may vary according to the size of a light-transmitting region TR. The size of a light-transmitting region TR is proportional to the size of a probe cell. For example, if each probe cell is a square having a side of about 10 μm or greater and thus an area of 100 μm$^2$ or greater, a proportion (the sum of the sizes of light-transmitting regions if there are a plurality of light-transmitting regions) of the light-transmitting regions TR in the mask 201 may be equal to or greater than approximately 5% of a total proportion (the sum of the sizes of all light-transmitting and light-blocking regions) of the light-transmitting and light-blocking regions TR and BR in the mask 201. However, if the size of each probe cell is smaller than about 100 μm², the minimum light-transmitting proportion is greater than the above figure.

For example, if the size of each probe cell is about 1 through 100 μm², the proportion of the light-transmitting regions TR in the mask 201 may be equal to or greater than approximately 7.5% of the total proportion of the light-transmitting and light-blocking regions TR and BR in the mask 201. If the size of each probe cell is about 0.01 through 1 μm², the proportion of the light-transmitting regions TR in the mask 201 may be equal to or greater than approximately 10% of the total proportion of the light-transmitting and light-blocking regions TR and BR in the mask 201.

In FIG. 3, two of 12 segments of the mask 201 are occupied by the light-transmitting regions TR. If the size of each light-transmitting region TR is equal to that of each light-blocking region BR, the proportion of the light-transmitting regions TR in the mask 201 is approximately 16.7%, that is, more than 10%, of the total proportion of the light-transmitting regions TR and the light-blocking regions BR in the mask 201. Therefore, the mask 201 illustrated in FIG. 3 can be applied when the size of each probe cell is about 0.01 μm² or greater.

Figure 6:
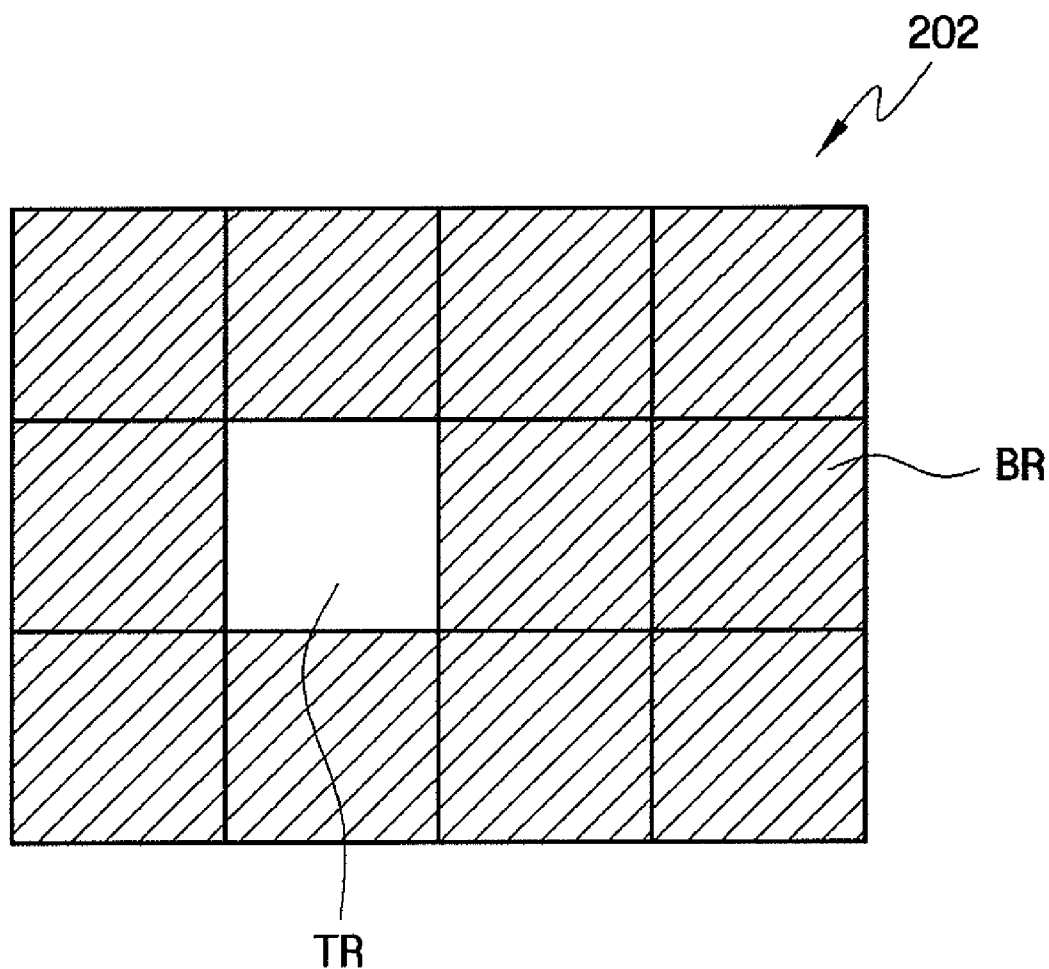
FIG. 6 is a plan view of a mask according to another embodiment of the present invention.

FIG. 6 is a plan view of a mask 202 according to another embodiment of the present invention. Unlike the mask 201 illustrated in FIG. 3, the mask 202 illustrated in FIG. 6 allocates one of its twelve segments to a light-transmitting region TR. Therefore, a proportion of the light-transmitting region TR of the mask 202 illustrated in FIG. 6 is approximately 8.3% of a total proportion of the light-transmitting region TR and light-blocking regions BR in the mask 202. It is not impossible to use the mask 202 to fabricate probes of a microarray in which the size of each probe cell is about 0.01 through 1 μm². However, the mask 202 may be used to fabricate probes of a microarray in which the size of each probe cell is about 1 μm² or greater to enhance the reliability of the in-situ synthesis of the probes. If the size of each probe cell that is to be synthesized may be within the range of about 0.01 through 1 μm² and if it is challenging to change the size, the design pattern of the mask 202 illustrated in FIG. 6 can be changed using a mask layout determination method according to an embodiment of the present invention, which will be described later, in a mask layout process performed before a mask fabrication process. Hence, the mask 202 may be fabricated to have the changed design pattern and provided accordingly.

Figure 7:
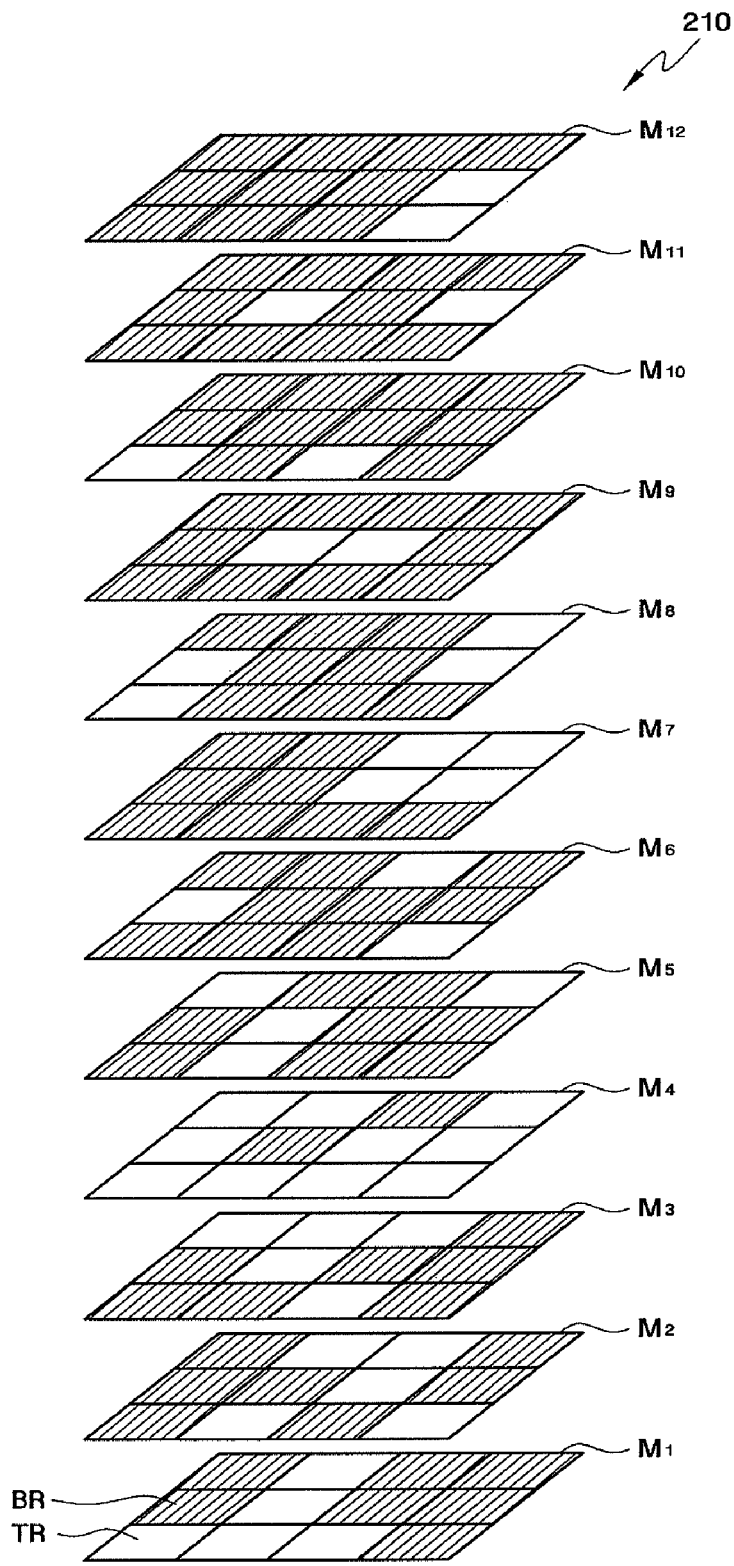
FIG. 7 is a perspective view of a mask set according to an embodiment of the present invention.

FIG. 7 is a perspective view of a mask set 210 according to an embodiment of the present invention. The mask set 210 includes a plurality of masks fabricated according to the above-mentioned embodiments of the present invention. Referring to FIG. 7, an exemplary, non-limiting mask set 210 according to an embodiment of the invention includes 12 masks $M_1$-$M_{12}$. Each of the masks $M_1$-$M_{12}$ is used for at least one lithography process to synthesize probes of a microarray. Therefore, the mask set 210 illustrated in FIG. 7 may be used for a total of at least 12 lithography processes to synthesize probes of a microarray. It is to be understood, however, that this mask set is illustrative, and mask sets according to other embodiments of the invention can have a different number of masks.

Each lithography process is performed to synthesize a probe monomer. Therefore, each of the masks $M_1$-$M_{12}$ can be allocated to any one of a plurality of probe monomers that are to be synthesized. For example, if a monomer that is to be synthesized is a nucleotide phosphoamidite monomer having any one of adenine (A), guanine (G), thymine (T), and cytosine (C) as a base, each of the masks $M_1$-$M_{12}$ is allocated to the nucleotide phosphoamidite monomer having any one of adenine (A), guanine (G), thymine (T), and cytosine (C) as a base.

Each of the masks $M_1$-$M_{12}$ that comprise the mask set 210 satisfies the conditions of the masks according to the embodiments of the present invention. Therefore, if the mask set 210 is used to synthesize probes of a microarray having probe cells, the size of each probe cell being about 100 μm² or greater, the proportion of light-transmitting regions TR in each of the masks $M_1$-$M_{12}$ may be more than approximately 5% of the total proportion of the light-transmitting and light-blocking regions TR and BR in each of the masks $M_1$-$M_{12}$. Similarly, if the size of each probe cell is about 1 through 100 μm², the light-transmitting regions TR may occupy more than approximately 7.5% of each of the masks $M_1$-$M_{12}$. If the size of each probe cell is about 0.01 through 1 μm², the light-transmitting regions TR may occupy more than approximately 10% of each of the masks $M_1$-$M_{12}$.

Hereinafter, a method of fabricating a mask set according to an embodiment of the invention will be described. In the following embodiment, for convenience, it is assumed that the size of each probe cell in a microarray for probes to be synthesized is about 0.01 through 1 μm² and that the proportion of light-transmitting regions in each mask is equal to or greater than approximately 10% of the total proportion of the light-transmitting and light-blocking regions in each mask. However, it is to be understood that methods according to other embodiments of the invention are not limited to probe cells of this size.

Figure 8:
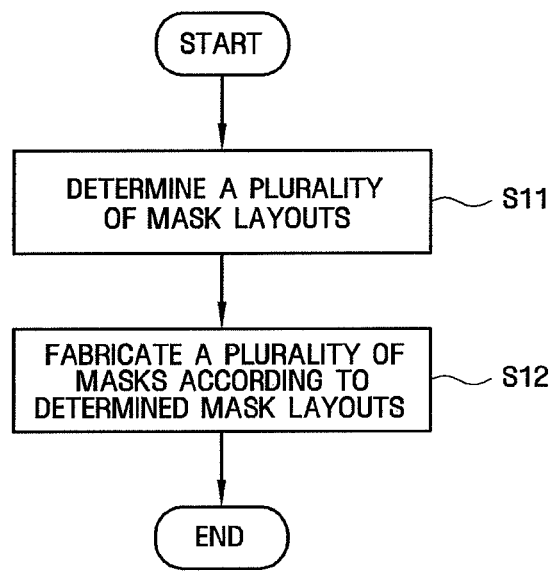
FIG. 8 is a flowchart illustrating a method of fabricating a mask set according to an embodiment of the present invention.

FIG. 8 is a flowchart illustrating a method of fabricating a mask set according to an embodiment of the present invention.

Referring to FIG. 8, a plurality of mask layouts are determined (operation S11). Here, the mask layout includes an arrangement plan of mask patterns and mask pattern data which are required to fabricate a mask. That is, the mask layout may be provided as a drawing or as a data sheet. In addition, the mask layout may be provided as a way in which the mask pattern data is stored in a computer.

As assumed above, all masks that are to be fabricated according to the present embodiment aim to have light-transmitting regions TR occupying more than approximately 10% of the total proportion of the light-transmitting and light-blocking regions TR and BR. Accordingly, a plurality of mask layouts are determined to correspond to the aimed masks.

Next, a plurality of masks are fabricated according to the determined mask layouts (operation S12). The masks may be fabricated according to the determined mask layouts and using a method substantially identical to the method of fabricating a mask described above with reference to FIGS. 5A through 5C.

The operation of determining the mask layouts will now be described in more detail.

Figure 9:
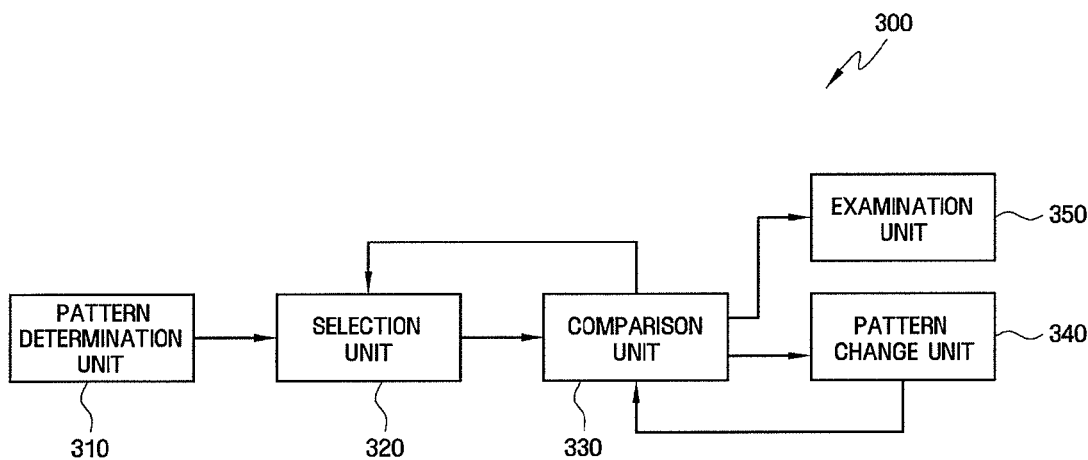
FIG. 9 is a block diagram of a mask layout determination system according to an embodiment of the present invention.

The mask layouts may be determined using a mask layout determination system. FIG. 9 is a block diagram of a mask layout determination system 300 according to an embodiment of the present invention. Referring to FIG. 9, the mask layout determination system 300 includes a pattern determination unit 310, a selection unit 320, a comparison unit 330, and a pattern change unit 340.

The pattern determination unit 310 receives probe sequence data of a microarray, generates a plurality of mask layouts, which are applied to performing in-situ synthesis on probes of the microarray using the received probe sequence data, and allocates light-transmitting regions TR and light-blocking regions BR to each mask layout.

The selection unit 320 receives data on each mask layout to which the light-transmitting regions TR and the light-blocking regions BR were allocated from the pattern determination unit 310 and selects any one of the mask layouts.

The comparison unit 330 compares a proportion of the light-transmitting regions TR in the mask layout selected by the selection unit 320 with a minimum light-transmitting proportion. If the proportion of the light-transmitting regions TR in the selected mask layout is equal to or greater than the minimum light-transmitting proportion, the comparison unit 330 transmits the comparison result to the selection unit 320. Then, the selection unit 320 selects another mask layout. If the proportion of the light-transmitting regions TR in the selected mask layout is smaller than the minimum light-transmitting proportion, the comparison unit 330 transmits the comparison result to the pattern change unit 340.

The pattern change unit 340 exchanges light-blocking regions BR of the selected mask layout, which includes the light-transmitting regions TR occupying a smaller proportion of the selected mask layout than the minimum light-transmitting proportion, with light-transmitting regions TR of another unselected mask layout, thereby increasing the number of light-transmitting regions TR included in the selected mask layout. Then, the pattern change unit 340 transmits the exchange result to the comparison unit 330. The comparison unit 330 compares the proportion of the increased number of light-transmitting regions TR in the selected mask layout with the minimum light-transmitting proportion.

Optionally, the mask layout determination system 300 may further include an examination unit 350. If the comparison unit 330 determines that the proportion of the light-transmitting regions TR in each mask layout is equal to or greater than the minimum light-transmitting proportion, the examination unit 350 simulates probe synthesis using the mask layouts and examines whether the sequence of the simulation-synthesized probes is substantially identical to the probe sequence data (a desired probe sequence) initially provided by the pattern determination unit 310.

Figure 10:
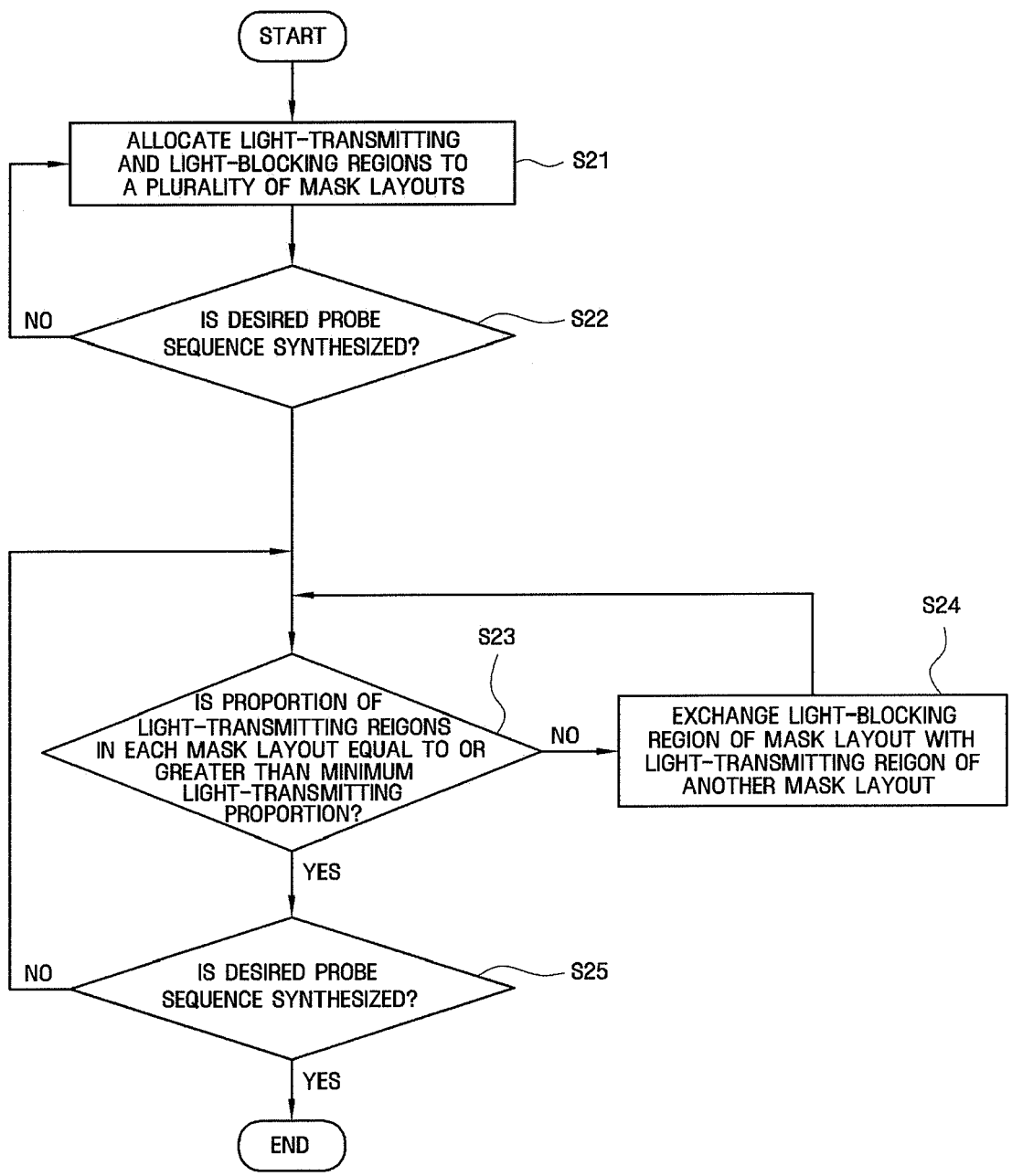
FIG. 10 is a flowchart illustrating a mask layout determination method according to an embodiment of the present invention.

FIG. 10 is a flowchart illustrating a mask layout determination method according to an embodiment of the present invention. Referring to FIG. 10, light-transmitting regions TR and light-blocking regions BR are allocated to a plurality of mask layouts (operation S21). Specifically, any one of monomers that are to be synthesized can be allocated to each of the mask layouts, and the sequence of the mask layouts to which any one of monomers is allocated is determined. Next, each mask layout is divided into a plurality of segments respectively corresponding to a plurality of probe cells. Then, the light-transmitting regions TR and the light-blocking regions BR are allocated to each segment.

Next, it is determined whether a desired probe sequence is synthesized in each probe cell (operation S22). If the desired probe sequence is not synthesized, the light-transmitting regions TR and the light-blocking regions BR are allocated again to each mask layout.

If the desired probe sequence is synthesized after operations S21 and S22 are repeated, it is determined whether a proportion of the light-transmitting regions TR in each mask layout is equal to or greater than a minimum light-transmitting proportion (operation S23). If the proportion of the light-transmitting regions TR in any one of the mask layouts is smaller than the minimum light-transmitting proportion, light-blocking regions BR of the selected mask layout are exchanged with light-transmitting regions TR of another mask layout (operation S24). In this case, the light-transmitting and light-blocking regions TR and BR, which are exchanged with each other, may correspond to the same probe cell. In addition, the same monomers may be allocated to the selected mask layout and another mask layout, light-transmitting regions TR of which are to be exchanged with light-blocking regions BR of the selected mask layout.

Although the light-blocking regions BR are exchanged with the light-transmitting regions TR, the same probe sequence may be synthesized in the corresponding probe cell. Probe monomers are synthesized when they correspond to a light-transmitting region TR of a mask layout which corresponds to a probe cell. In this case, the monomers that are to be synthesized may be monomers allocated to a mask layout including the light-transmitting region TR that corresponds to the probe cell. Consequently, a probe sequence synthesized in the probe cell is substantially identical to the sequence of monomers allocated to the light-transmitting region TR that corresponds to the probe cell. Therefore, if the sequence of the monomers allocated to the light-transmitting region TR that corresponds to the probe cell is compared before and after the exchange, it can be identified whether substantially the same probe sequence is synthesized before and after the exchange.

After the light-blocking and light-transmitting regions BR and TR are exchanged between the mask layouts, it is determined again whether the proportion of the light-transmitting regions TR in the selected mask layout is equal to or greater than the minimum light-transmitting proportion (operation S23). If the proportion of the light-transmitting regions TR in the selected mask layout is still smaller than the minimum light-transmitting proportion, the light-blocking and light-transmitting regions BR and TR are exchanged again (operation S24). Operations S23 and S24 are repeated until the proportion of the light-transmitting regions TR in each mask layout is equal to or greater than the minimum light-transmitting proportion. Consequently, the proportion of the light-transmitting regions TR in each mask layout becomes equal to or greater than the minimum light-transmitting proportion.

Optionally, it is examined whether the desired probe sequence is synthesized using the mask layouts which have exchanged the light-transmitting and/or light-blocking regions TR and BR (operation S25). This examination is designed to enhance the reliability of the mask layouts with the changed patterns. If any one pattern in a plurality of mask layouts is flawed, when probes are synthesized using the mask layouts, a flawed probe sequence may be synthesized, which results in a flaw in the entire microarray. Therefore, it is desirable to perform a probe synthesis simulation test as a last operation.

FIGS. 11 through 14 are perspective views for explaining operations of changing patterns of mask layouts according to an embodiment of the present invention. Operations S23 and S24 will now be described in more detail with reference to FIGS. 11 through 14.

The present embodiment is based on the following non-limiting assumptions: that is, a microarray where probes are to be synthesized includes 12 probe cells; the size of each probe cell is within the range of about 0.01 through 1 $\mu m^2$, and a minimum light-transmitting proportion of each mask is about 10% of the proportion of light-transmitting and light-blocking regions TR and BR in each mask; and the sequence of monomers to be synthesized in each probe cell is as shown in Table 1.

TABLE 1

| | Probe cell | | | | | |
|---|---|---|---|---|---|---|
| | $P_1$ | $P_2$ | $P_3$ | $P_4$ | $P_5$ | $P_6$ |
| Probe sequence | ATTC | ACTA | AGTC | CTCT | GTCT | AAAG |
| | Probe cell | | | | | |
| | $P_7$ | $P_8$ | $P_9$ | $P_{10}$ | $P_{11}$ | $P_{12}$ |
| Probe sequence | CTGA | TGTT | GTAG | ACGT | CGCG | TAGT |

(In Table 1, $P_1$-$P_{12}$ indicate first through twelfth probe cells. In addition, A, C, G and T respectively indicate monomers that are to be synthesized).

As described above with reference to FIG. 10, the patterns and arrangement of a plurality of mask layouts are determined to synthesize the above probe sequences. A detailed description will be made with reference to Table 2 and FIG. 11.

To change the patterns of the first through twelfth mask layouts $ML_1$-$ML_{12}$, a mask layout, in which light-transmitting regions proportion is smaller than a minimum light-transmitting proportion, is selected. In Table 2, mask layouts in which the light-transmitting regions TR account for less than 10%, i.e., the minimum light-transmitting proportion, are the tenth through twelfth mask layouts $ML_{10}$-$ML_{12}$. That is, each of the tenth through twelfth mask layouts $ML_{10}$-$ML_{12}$ has only one light-transmitting region TR. Accordingly one of the tenth through twelfth mask layouts $ML_{10}$-$ML_{12}$ is selected. For example, the twelfth mask layout $ML_{12}$, which is the last one of the tenth through twelfth mask layouts $ML_{10}$-$ML_{12}$, is selected.

Next, light-blocking regions BR of the selected twelfth mask layout $ML_{12}$ are exchanged with light-transmitting regions TR of another mask layout, that is, one of the first through eleventh mask layouts $ML_1$-$ML_{11}$. To maintain the probe synthesis sequence, an equal number of light-transmitting regions TR to the number of light-blocking regions BR, which correspond to the same probe cell, may be exchanged.

TABLE 2

| Probe Cell | Probe Sequence | $ML_1$ A | $ML_2$ C | $ML_3$ G | $ML_4$ T | $ML_5$ A | $ML_6$ C | $ML_7$ G | $ML_8$ T | $ML_9$ A | $ML_{10}$ C | $ML_{11}$ G | $ML_{12}$ T |
|---|---|---|---|---|---|---|---|---|---|---|---|---|---|
| $P_1$ | ATTC | A | | | T | | | | T | | C | | |
| $P_2$ | ACTA | A | C | | T | A | | | | | | | |
| $P_3$ | AGTC | A | | G | T | | C | | | | | | |
| $P_4$ | CTCT | | C | | T | | C | | T | | | | |
| $P_5$ | GTCT | | | G | T | | C | | T | | | | |
| $P_6$ | AAAG | A | | | | A | | | | A | | G | |
| $P_7$ | CTGA | | C | | T | | | G | | A | | | |
| $P_8$ | TGTT | | | | T | | | G | T | | | | T |
| $P_9$ | ATAG | | | G | T | A | | G | | | | | |
| $P_{10}$ | ACGT | A | C | G | T | | | | | | | | |
| $P_{11}$ | CGCG | | C | G | | | C | G | | | | | |
| $P_{12}$ | TAGT | | | | T | A | | G | T | | | | |
| Number of light transmitting regions | | 5 | 5 | 5 | 10 | 4 | 4 | 5 | 5 | 2 | 1 | 1 | 1 |

Figure 11:
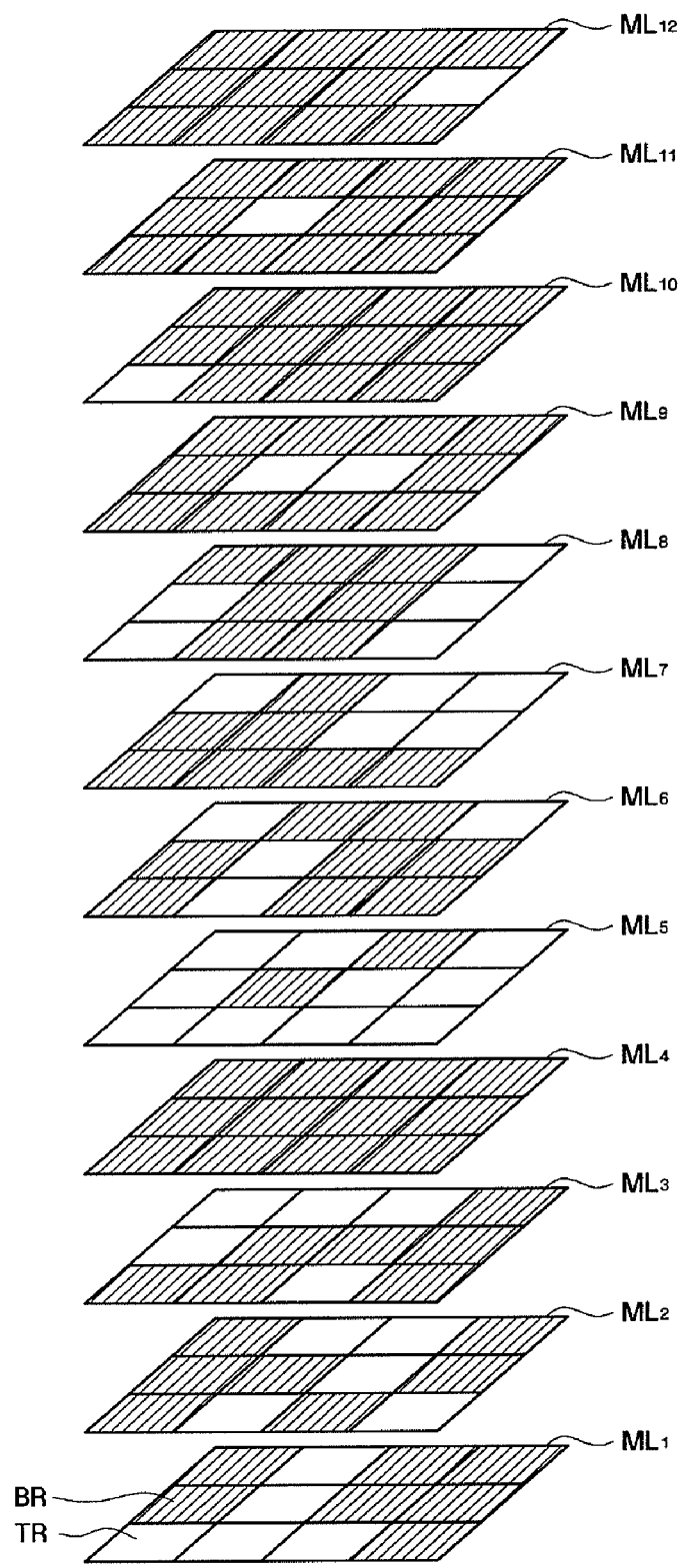
FIGS. 11 through 14 are perspective views for explaining operations of changing patterns of mask layouts according to an embodiment of the present invention.

Referring to Table 2 and FIG. 11, a plurality of, i.e., first through twelfth mask layouts $ML_1$-$ML_{12}$ are prepared and sequentially arranged. The embodiment of Table is exemplary and non-limiting, and it is to be understood that microarrays according to other embodiments can use a different number of mask layouts and a different number of probe cells. Then, monomers A, C, G and T that are to be synthesized are sequentially and alternately allocated to each of the first through twelfth mask layouts $ML_1$-$ML_{12}$. In addition, each of the first through twelfth mask layouts $ML_1$-$ML_{12}$ is divided into a plurality of segments respectively corresponding to first through twelve probe cells $P_1$-$P_{12}$. Then, monomers to be synthesized in a segment corresponding to each of the first through twelfth probe cells $P_1$-$P_{12}$ in each of the first through twelfth mask layouts $ML_1$-$ML_{12}$ are checked according to the target probe sequence of each of the first through twelfth probe cells $P_1$-$P_{12}$. Then, the light-transmitting regions TR are allocated to the segments. In addition, the light-blocking regions BR are allocated to all remaining segments except the light-transmitting regions TR of each of the first through twelfth mask layouts $ML_1$-$ML_{12}$. Then, mask layouts to which the light-transmitting regions TR are not allocated are removed, thereby determining the final number of mask layouts. The final number of mask layouts may be determined to be a minimum applicable number.

In Table 2, an example satisfying the above condition may be to move any one of A, G, C, and T in a row direction to a blank column.

Figure 12:
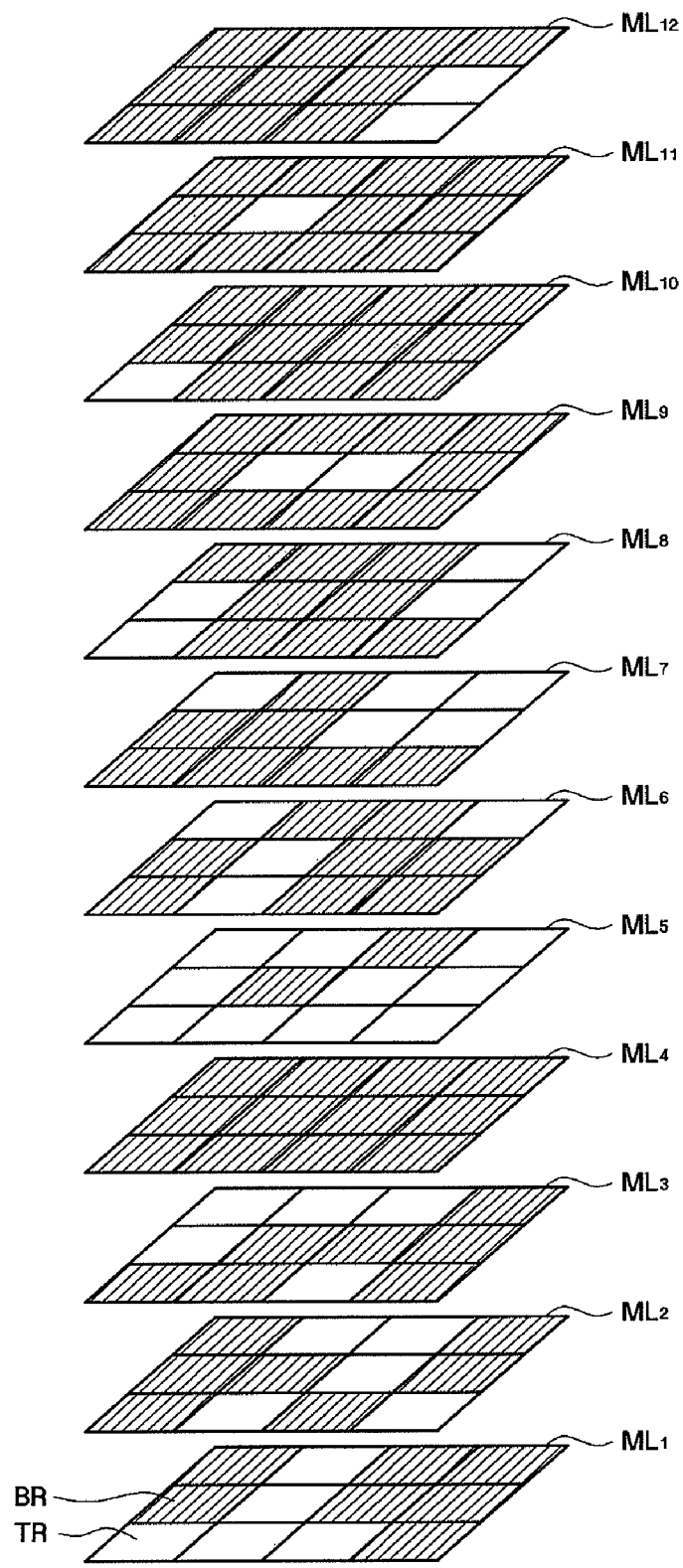

In addition, mask layouts, which will exchange the light-transmitting and light-blocking regions TR and BR with the selected twelfth mask layout $ML_{12}$, may be mask layouts which have been allocated the same monomer as the synthesis target monomer allocated to the twelfth mask layout $ML_{12}$, here monomer T. That is, the fourth mask layout $ML_4$ and the eighth mask layout $ML_8$ to which the synthesis target monomer T is allocated are candidate mask layouts. A light-transmitting region TR, which can be exchanged without changing the probe sequence, is a light-transmitting region TR corresponding to fourth, fifth, and twelfth probe cells $P_4$, $P_5$, and $P_{12}$ of the eighth mask layout $ML_8$. Therefore, one of the light-transmitting regions TR corresponding to the fourth, fifth, and twelfth probe cells $P_4$, $P_5$, and $P_{12}$ of the eighth mask layout $ML_8$ is exchanged with a corresponding light-blocking region BR of the twelfth mask layout $ML_{12}$. Table 3 below shows an example in which the light-transmitting region TR corresponding to the fourth probe cell $P_4$ of the eighth mask layout $ML_8$ is exchanged with the light-blocking region BR corresponding to the fourth probe cell $P_4$ of the selected twelfth mask layout $ML_{12}$. This example is also illustrated in FIG. 12.

TABLE 3

| Probe Cell | Probe Sequence | $ML_1$ A | $ML_2$ C | $ML_3$ G | $ML_4$ T | $ML_5$ A | $ML_6$ C | $ML_7$ G | $ML_8$ T | $ML_9$ A | $ML_{10}$ C | $ML_{11}$ G | $ML_{12}$ T |
|---|---|---|---|---|---|---|---|---|---|---|---|---|---|
| $P_1$ | ATTC | A | | | T | | | | T | | C | | |
| $P_2$ | ACTA | A | C | | T | A | | | | | | | |
| $P_3$ | AGTC | A | | G | T | | C | | | | | | |
| $P_4$ | CTCT | | C | | T | | C | | | | | | T |
| $P_5$ | GTCT | | | G | T | | C | | T | | | | |
| $P_6$ | AAAG | A | | | | A | | | | A | | G | |
| $P_7$ | CTGA | | C | | T | | | G | | A | | | |
| $P_8$ | TGTT | | | | T | | | G | T | | | | T |
| $P_9$ | GTAG | | | G | T | A | | G | | | | | |
| $P_{10}$ | ACGT | A | C | G | T | | | | | | | | |
| $P_{11}$ | CGCG | | | C | G | | C | G | | | | | |
| $P_{12}$ | TAGT | | | | T | A | | G | T | | | | |
| Number of light transmitting regions | | 5 | 5 | 5 | 10 | 4 | 4 | 5 | 4 | 2 | 1 | 1 | 2 |

It is determined whether the proportion of the light-transmitting region TR in the selected mask layout is equal to or greater than the minimum light-transmitting proportion. If the proportion of the light-transmitting region TR is still smaller than the minimum light-transmitting proportion even after the exchange of the light-transmitting and light-blocking regions TR and BR, any one of light-transmitting regions TR corresponding to the fifth and twelfth probe cells $P_5$ and $P_{12}$ of the eighth mask layout $ML_8$ is exchanged with the light-blocking regions BR corresponding to the same probe cells, i.e., the fifth and twelfth probe cells $P_5$ and $P_{12}$ of the twelfth mask layout $ML_{12}$. However, referring to Table 3 and FIG. 12, since the number of light-transmitting regions TR of the twelfth mask layout $ML_{12}$ has been increased to two, the proportion of the light-transmitting regions TR is already equal to or greater than the minimum light-transmitting proportion. If the proportion of the light-transmitting regions TR is greater than the minimum light-transmitting proportion as described above, the pattern change of the selected mask layout is stopped, and a next mask layout is selected. For example, the eleventh mask layout $ML_{11}$ immediately before the twelfth mask layout $ML_{12}$ is selected.

Referring to Table 3 and FIG. 12, light-blocking regions BR of the selected eleventh mask layout $ML_{11}$ are exchanged with light-transmitting regions TR of another mask layout using the same method used to change the pattern of the twelfth mask layout $ML_{12}$. In this case, it is desirable to exclude the twelfth mask layout $ML_{12}$, whose pattern has already been changed, from candidate mask layouts. Therefore, the first through tenth mask layouts $ML_1$-$ML_{10}$ can be candidate mask layouts. Of the first through tenth mask layouts $ML_1$-$ML_{10}$, mask layouts having been allocated the same monomer as a synthesis target monomer allocated to the eleventh mask layout $ML_{11}$, which is monomer G, are determined to be final candidate layouts. Therefore, the third mask layout $ML_3$ and the seventh mask layout $ML_7$ to which the synthesis target monomer G is allocated are final candidate mask layouts. A light-transmitting region TR, which can be exchanged without changing the probe sequence, is a light-transmitting region TR corresponding to the ninth and eleventh probe cells $P_9$ and $P_{11}$ of the seventh mask layout $ML_7$. For example, a light-transmitting region TR corresponding to the ninth probe cell $P_9$ of the seventh mask layout $ML_7$ is exchanged with a light-blocking region BR corresponding to the ninth probe cell $P_9$ of the eleventh mask layout $ML_{11}$. The result is shown in Table 4 and FIG. 13.

TABLE 4

| Probe Cell | Probe Sequence | $ML_1$ A | $ML_2$ C | $ML_3$ G | $ML_4$ T | $ML_5$ A | $ML_6$ C | $ML_7$ G | $ML_8$ T | $ML_9$ A | $ML_{10}$ C | $ML_{11}$ G | $ML_{12}$ T |
|---|---|---|---|---|---|---|---|---|---|---|---|---|---|
| $P_1$ | ATTC | A | | | T | | | | T | | C | | |
| $P_2$ | ACTA | A | C | | T | A | | | | | | | |
| $P_3$ | AGTC | A | | G | T | | C | | | | | | |
| $P_4$ | CTCT | | C | | T | | C | | | | | | T |
| $P_5$ | GTCT | | | G | T | | C | | T | | | | |
| $P_6$ | AAAG | A | | | | A | | | | A | | G | |
| $P_7$ | CTGA | | C | | T | | | G | | A | | | |
| $P_8$ | TGTT | | | | T | | | G | T | | | | T |
| $P_9$ | GTAG | | | G | T | A | | | | | | G | |
| $P_{10}$ | ACGT | A | C | G | T | | | | | | | | |
| $P_{11}$ | CGCG | | | C | G | | C | G | | | | | |
| $P_{12}$ | TAGT | | | | T | A | | G | T | | | | |
| Number of light transmitting regions | | 5 | 5 | 5 | 10 | 4 | 4 | 4 | 4 | 2 | 1 | 2 | 2 |

Figure 13:
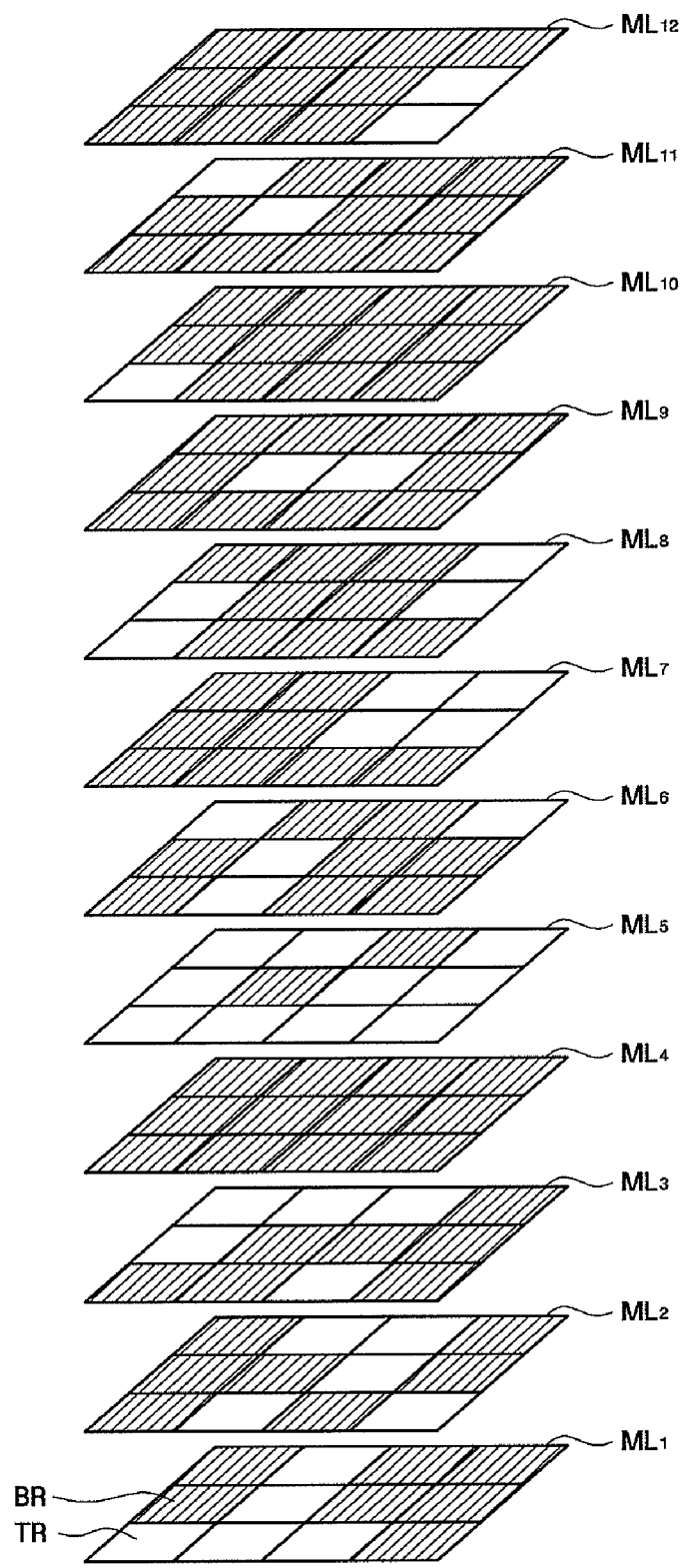

Referring to Table 4 and FIG. 13, after the light-transmitting and light-blocking regions TR and BR are exchanged, the number of light-transmitting regions TR of the eleventh mask layout $ML_{11}$ is increased to two. Consequently, the proportion of the light-transmitting region TR of the eleventh mask layout $ML_{11}$ becomes equal to or greater than the minimum light-transmitting proportion. Accordingly, a next mask layout is selected. Here, the remaining mask layout is the tenth mask layout $ML_{10}$. If the same method is used for the tenth mask layout $ML_{10}$, a light-transmitting region TR corresponding to the third probe cell $P_3$ of the sixth mask layout $ML_6$ is a target light-transmitting region to be exchanged. If the light-transmitting region TR corresponding to the third probe cell $P_3$ of the sixth mask layout $ML_6$ is exchanged with the light-blocking region BR corresponding to the third probe cell $P_3$ of the tenth mask layout $ML_{10}$, the mask layout as shown in Table 5 and FIG. 14 is determined.

TABLE 5

| Probe Cell | Probe Sequence | $ML_1$ A | $ML_2$ C | $ML_3$ G | $ML_4$ T | $ML_5$ A | $ML_6$ C | $ML_7$ G | $ML_8$ T | $ML_9$ A | $ML_{10}$ C | $ML_{11}$ G | $ML_{12}$ T |
|---|---|---|---|---|---|---|---|---|---|---|---|---|---|
| $P_1$ | ATTC | A | | | T | | | | T | | C | | |
| $P_2$ | ACTA | A | C | | T | A | | | | | | | |
| $P_3$ | AGTC | A | | G | T | | | | | | C | | |
| $P_4$ | CTCT | | C | | T | | C | | | | | | T |
| $P_5$ | GTCT | | | G | T | | C | | T | | | | |
| $P_6$ | AAAG | A | | | | A | | | | | A | G | |
| $P_7$ | CTGA | | C | | T | | | G | | A | | | |
| $P_8$ | TGTT | | | | T | | | G | T | | | | T |
| $P_9$ | GTAG | | | G | T | A | | | | | | G | |
| $P_{10}$ | ACGT | A | C | G | T | | | | | | | | |
| $P_{11}$ | CGCG | | C | G | | | C | G | | | | | |
| $P_{12}$ | TAGT | | | | T | A | | G | T | | | | |
| Number of light transmitting regions | | 5 | 5 | 5 | 10 | 4 | 3 | 4 | 4 | 2 | 2 | 2 | 2 |

Figure 14:
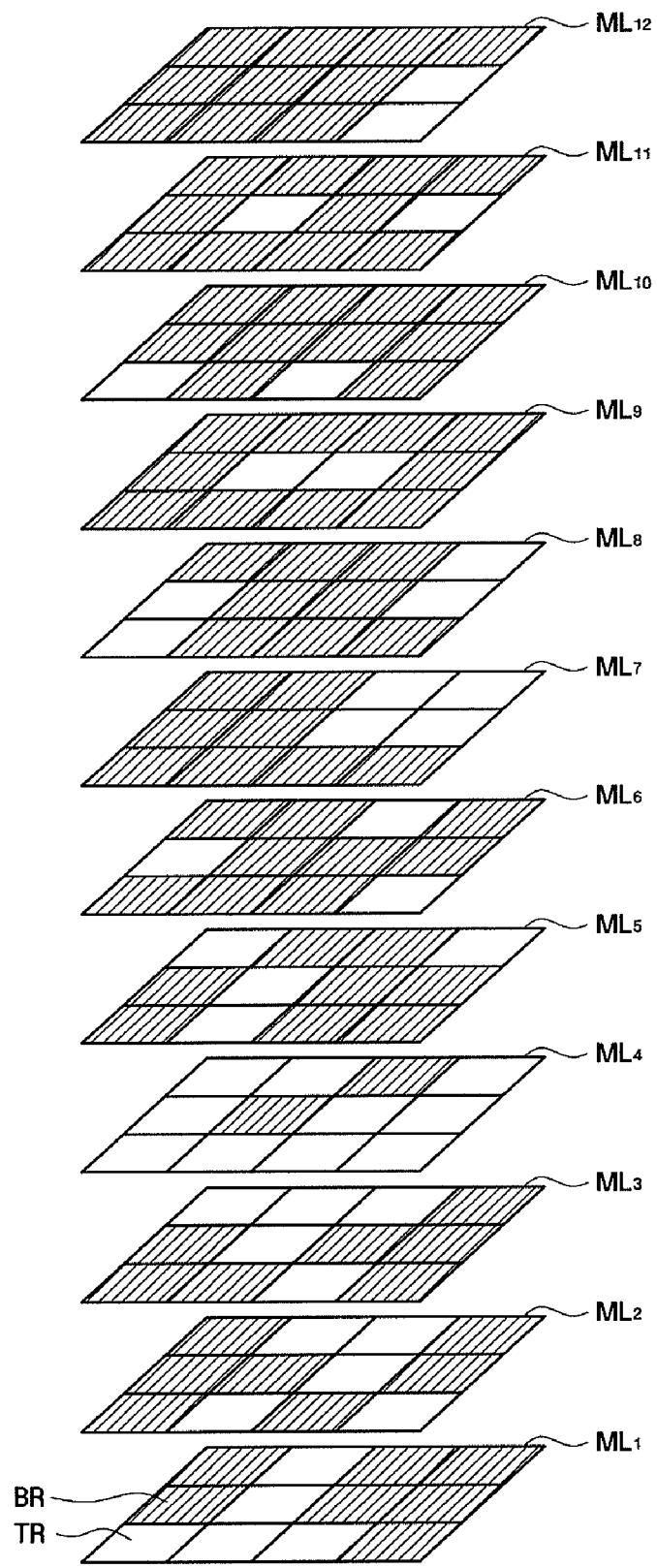

Referring to Table 5 and FIG. 14, as a result of changing the patterns, the proportion of the light-transmitting regions TR in each of the first through twelfth mask layouts $ML_1$-$ML_{12}$ is equal to or greater than the minimum light-transmitting proportion. Therefore, the operations of changing patterns are terminated, and the final patterns of the first through twelfth mask layouts $ML_1$-$ML_{12}$ are determined.

Since the proportion of the light-transmitting regions TR in each of the first through twelfth mask layouts $ML_1$-$ML_{12}$ determined as described above is equal to or greater than the minimum light-transmitting proportion, if a plurality of masks are fabricated using the first through twelfth mask layouts $ML_1$-$ML_{12}$, the reliability of mask patterns that are formed can be enhanced even if an electronic beam exposure of the same dose is used.

A method of fabricating a microarray using a mask set according to an embodiment of the invention which includes a plurality of masks as described above will now be described. FIGS. 15 through 21 are perspective views for explaining a method of fabricating a microarray according to an embodiment of the present invention. For illustrative purposes, it is assumed that a mask set used in the embodiment illustrated in FIGS. 15 through 21 has been fabricated using mask layouts determined with reference to Table 5 and FIG. 14 and that it is the mask set illustrated in FIG. 7.

Figure 15:
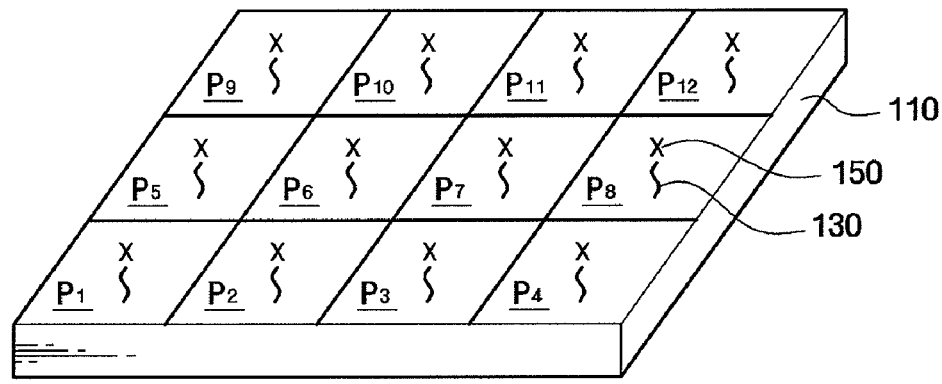
FIGS. 15 through 21 are perspective views for explaining a method of fabricating a microarray according to an embodiment of the present invention.

Referring to FIG. 15, a substrate 110 which includes an array of first through twelfth probe cells $P_1$-$P_{12}$, and whose surface is protected by a photolabile protecting group 150 is provided. In FIG. 15, the photolabile protecting group 150 is connected to a linker 130 which is coupled to the substrate 110, thereby protecting the surface of the substrate 110. A fixing layer is not illustrated in FIG. 15 for clarity.

Figure 16:
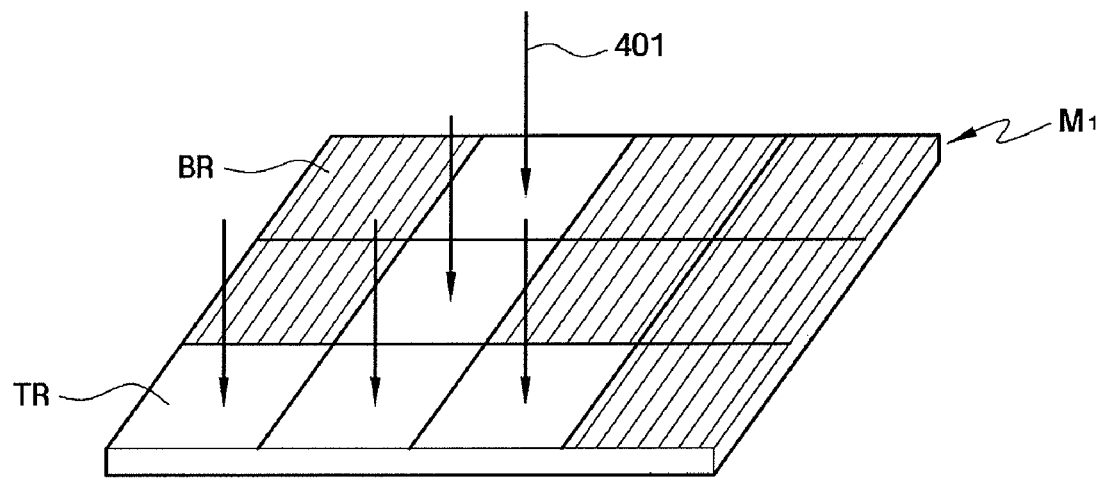
Figure 16:
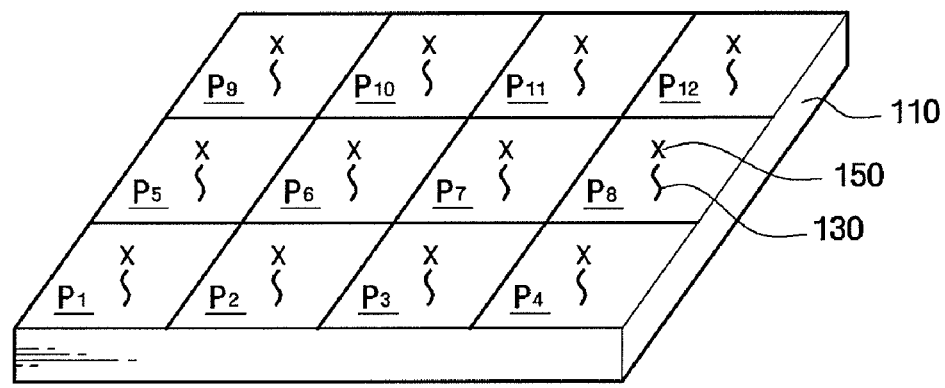

Referring to FIG. 16, the probe cells on the substrate 110 are exposed using a first mask $M_1$ of a mask set 210. Consequently, the first through third probe cells $P_1$-$P_3$, the sixth probe cell $P_6$, and the tenth probe cell $P_{10}$ corresponding light-transmitting regions TR of the first mask $M_1$ are exposed as indicated by reference numeral 401.

Figure 17:
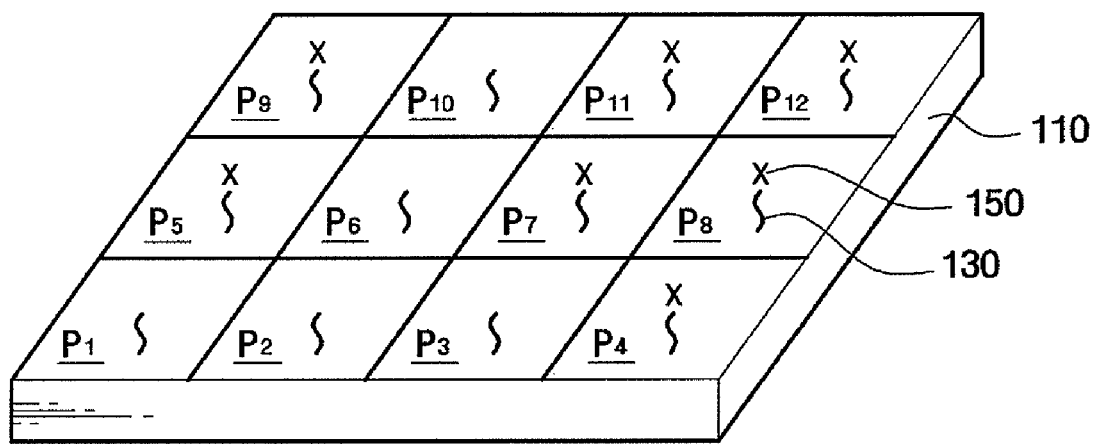

Referring to FIG. 17, as a result of the exposure, the photolabile protecting group 150 connected to the linker 130 in each of the first through third probe cells $P_1$-$P_3$, the sixth probe cell $P_6$, and the tenth probe cell $P_{10}$ is resolved, and a functional group of the linker 130 is exposed.

Figure 18:
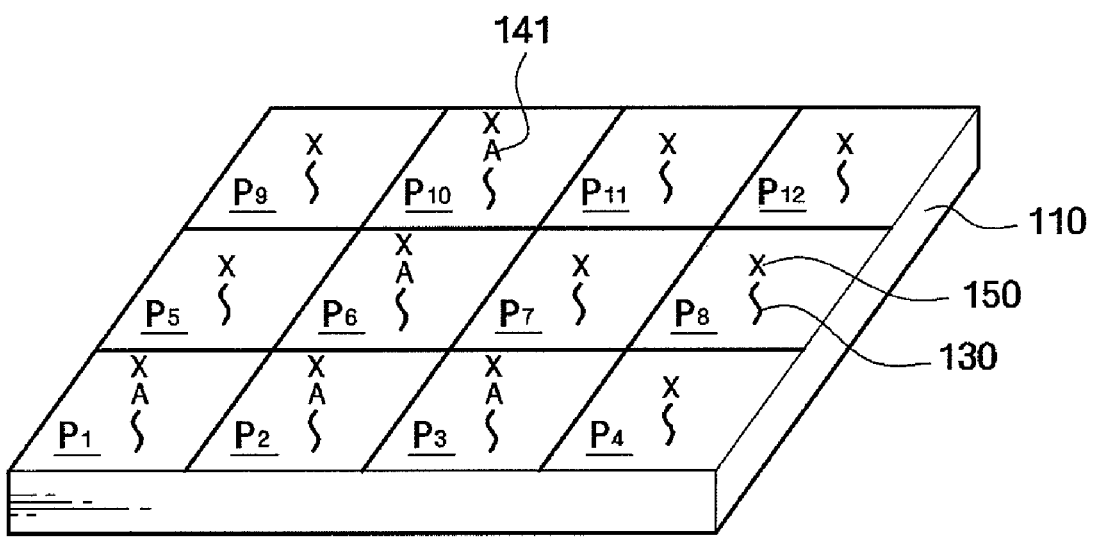

Referring to FIG. 18, a monomer A (141) connected to the photolabile protecting group 150 is provided on the resultant structure of FIG. 17. The monomer A (141) connected to the photolabile protecting group 150 is coupled to the linker 130 in each of the first through third probe cells $P_1$-$P_3$, the sixth probe cell $P_6$, and the tenth probe cell $P_{10}$. Since the fourth probe cell $P_4$, the fifth probe cell $P_5$, and the seventh through twelfth probe cells $P_7$-$P_{12}$ are protected by the photolabile protecting group 150, the monomer A (141) connected to the photolabile protecting group 150 is not connected thereto. Consequently, while the monomer A (141) is synthesized in each of the first through third probe cells $P_1$-$P_3$, the sixth probe cell $P_6$, and the tenth probe cell $P_{10}$, since it is connected to the photolabile protecting group 150, the surface of the synthesized substrate 110 is protected again by the photolabile protecting group 150 as illustrated in FIG. 15.

Figure 19:
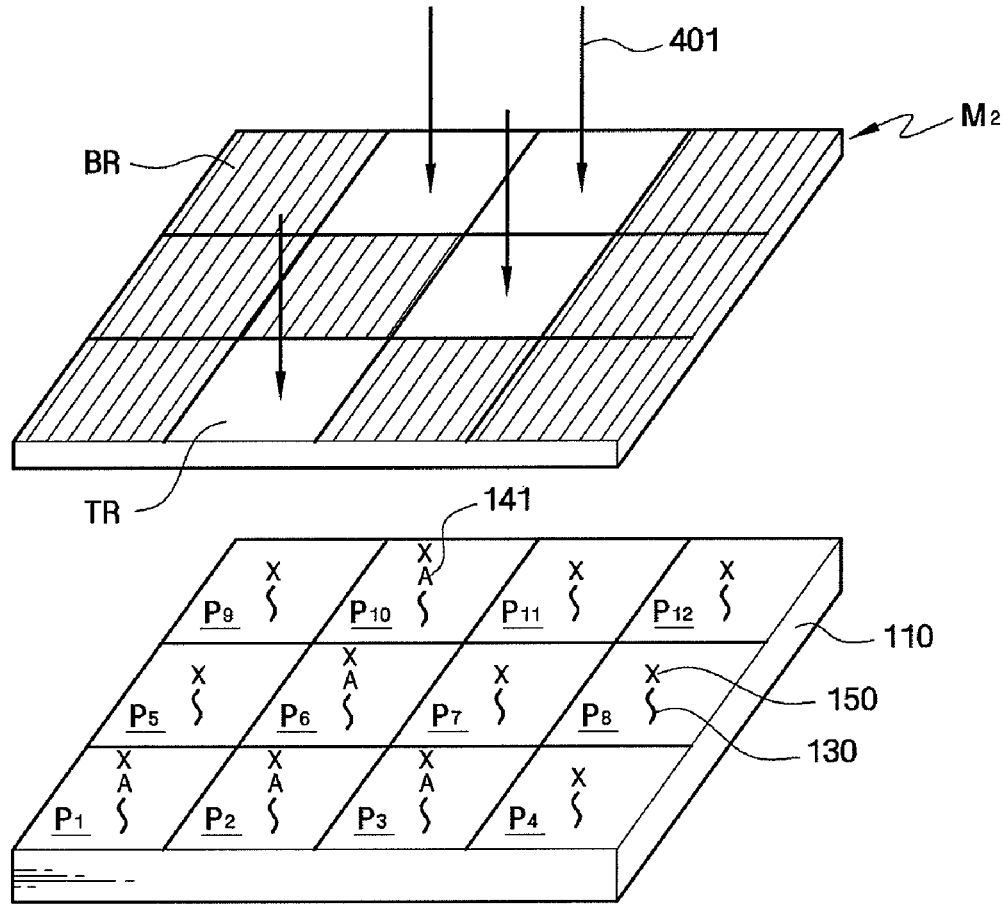

Referring to FIG. 19, the probe cells on the substrate 110 illustrated in FIG. 18 are exposed using a second mask $M_2$ of the mask set 210. Consequently, the second probe cell $P_2$, the seventh probe cell $P_7$, the tenth probe cell $P_{10}$, and the eleventh probe cell $P_{11}$ corresponding light-transmitting regions TR of the second mask $M_2$ are exposed as indicated by reference numeral 401.

Figure 20:
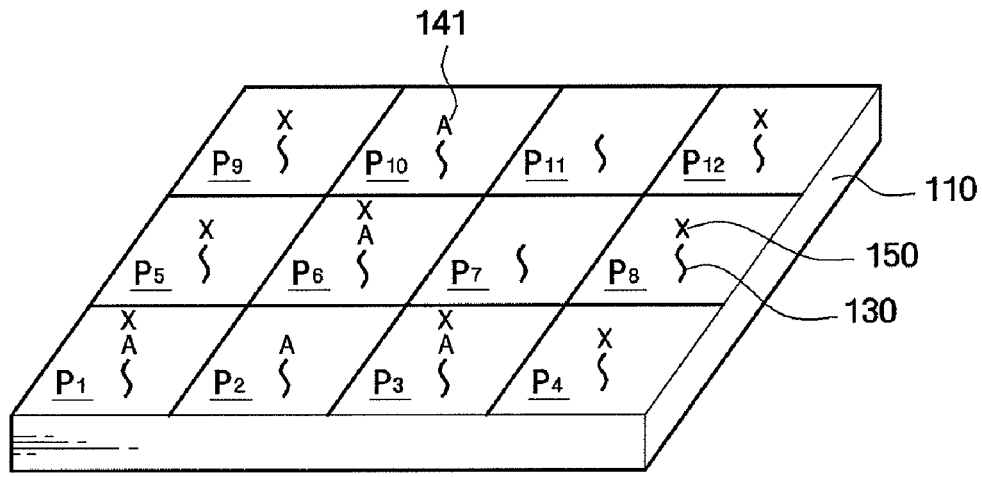

Referring to FIG. 20, as a result of the exposure, the photolabile protecting group 150 connected to the linker 130 or the monomer A (141) in each of the second probe cell $P_2$, the seventh probe cell $P_7$, the tenth probe cell $P_{10}$, and the eleventh probe cell $P_{11}$ is resolved, and a functional group of the linker 130 or the monomer A (141) is exposed.

Figure 21:
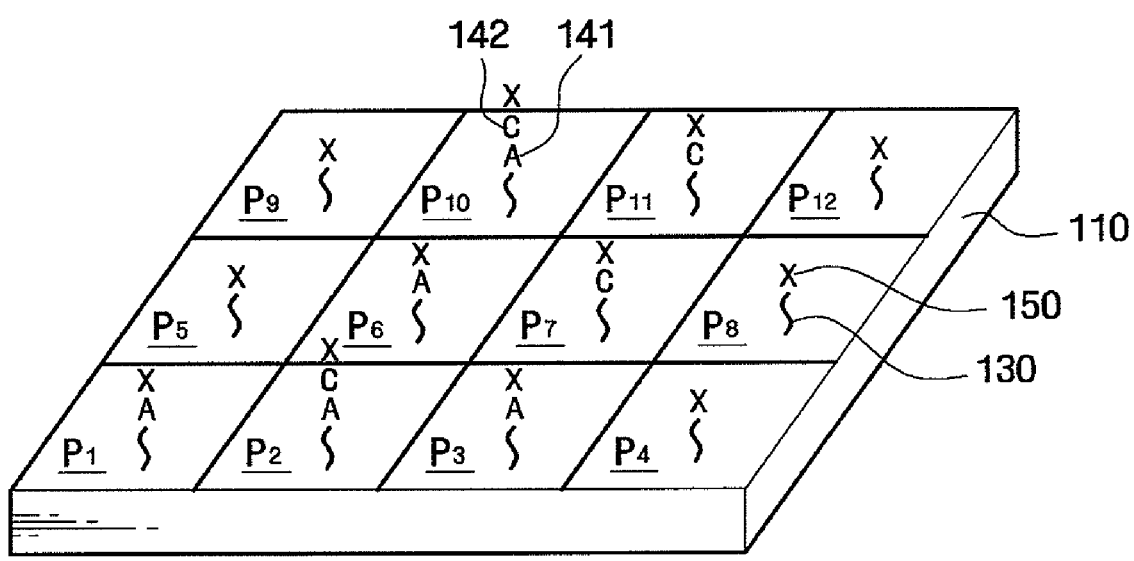

Referring to FIG. 21, a monomer C (142) connected to the photolabile protecting group 150 is provided in the resultant structure of FIG. 20. The monomer C (142) connected to the photolabile protecting group 150 is coupled to the linker 130 or the monomer A (141), whose functional group is exposed, in each of the second probe cell $P_2$, the seventh probe cell $P_7$, the tenth probe cell $P_{10}$, and the eleventh probe cell $P_{11}$. Since the first probe cell $P_1$, the third probe cell $P_3$, the fourth through sixth probe cells $P_4$-$P_6$, the eighth probe cell $P_8$, the ninth probe cell $P_9$, and the twelfth probe cell $P_{12}$ are protected by the photolabile protecting group 150, the monomer C (142) connected to the photolabile protecting group 150 is not connected thereto. Consequently, while the monomer C (142) is synthesized in each of the second probe cell $P_2$, the seventh probe cell $P_7$, the tenth probe cell $P_{10}$, and the eleventh probe cell $P_{11}$, since it is connected to the photolabile protecting group 150, the surface of the synthesized substrate 110 is protected again by the photolabile protecting group 150 as illustrated in FIG. 15.

If the in-situ synthesis is repeated on the third through twelfth masks $M_3$-$M_{12}$ using the method described above, a microarray including the first through twelfth probe cells $P_1$-$P_{12}$ whose respective probe sequences are as shown in Table 5 can be fabricated.

According to a mask layout determination method according to the present invention, a proportion of light-transmitting regions in each of a plurality of mask layouts can be controlled to be equal to or greater than a minimum light-transmitting proportion without changing the sequence of probes that are to be synthesized. Therefore, the pattern reliability of a mask set that is fabricated can be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation.

What is claimed is:

1. A mask layout determination system comprising:
    a pattern determination unit for allocating light-transmitting regions and light-blocking regions to each of a plurality of mask layouts adapted to performing in-situ synthesis on probes of a microarray;
    a selection unit for selecting any one of the mask layouts;
    a comparison unit for comparing a proportion of the light-transmitting regions in a selected mask layout with a minimum light-transmitting proportion; and
    a pattern change unit for exchanging a light-blocking region of the selected mask layout with a light-transmitting region of an unselected mask layout if the proportion of the light-transmitting regions in the selected mask layout is smaller than the minimum light-transmitting proportion.

2. The system of claim 1, wherein the minimum light-transmitting proportion is equal to or greater than about 5% of a total proportion of the light-transmitting and light-blocking regions.

3. The system of claim 1, wherein the light-transmitting and light-blocking regions respectively correspond to probe cells of the microarray.

4. The system of claim 3, wherein the light-blocking region of the selected mask layout and the light-transmitting region of the unselected mask layout, which are exchanged with each other, correspond to the same probe cell.

5. The system of claim 3, wherein the selected mask layout compared by the comparison unit is a mask layout selected by the selection unit and having at least one of the light-transmitting and light-blocking regions exchanged by the pattern change unit.

6. The system of claim 3, further comprising an examination unit for examining whether a desired target probe is in-situ synthesized using the mask layouts which comprise the mask layout whose light-blocking region is exchanged with the light-transmitting region by the pattern change unit.

7. A mask layout determination method comprising:
    allocating light-transmitting regions and light-blocking regions to each of a plurality of mask layouts which perform in-situ synthesis on probes of a microarray; and
    exchanging by a computer a light-blocking region of a mask layout with a light-transmitting region of another mask layout wherein a proportion of the light-transmitting regions in each mask layout is equal to or greater than a minimum light-transmitting proportion.

8. The method of claim 7, wherein the minimum light-transmitting proportion is equal to or greater than about 5% of a total proportion of the light-transmitting and light-blocking regions.

9. The method of claim 7, wherein the light-transmitting and light-blocking regions respectively correspond to probe cells of the microarray.

10. The method of claim 9, wherein the light-blocking region of a mask layout and the light-transmitting region of the another mask layout, which are exchanged with each other, correspond to the same probe cell.

11. The method of claim 10, wherein any one of synthesis target monomers is allocated to each of the mask layouts, and the light-blocking and light-transmitting regions are exchanged with each other between different mask layouts to which the same synthesis target monomer has been allocated, wherein an order of the synthesis target monomers allocated to the light-transmitting regions respectively corresponding to the probe cells remains unchanged before and after the exchange.

12. The method of claim 9, further comprising examining whether a desired target probe is in-situ synthesized using the mask layouts which comprise each mask layout whose light-blocking region is exchanged with a light-transmitting region.

13. A method of fabricating a mask set, the method comprising:
    allocating light-transmitting regions and light-blocking regions to each of a plurality of mask layouts which perform in-situ synthesis on probes of a microarray;
    exchanging a light-blocking region of a mask layout with a light-transmitting region of another mask layout wherein a proportion of the light-transmitting regions in each mask layout is equal to or greater than a minimum light-transmitting proportion; and
    fabricating a plurality of masks using the mask layouts which comprise each mask layout whose light-blocking region is exchanged with a light-transmitting region.

14. The method of claim 13, wherein the minimum light-transmitting proportion is equal to or greater than about 5% of a total proportion of the light-transmitting and light-blocking regions.

15. The method of claim 13, wherein the light-transmitting and light-blocking regions respectively correspond to probe cells of the microarray.

16. The method of claim 15, wherein the light-blocking region of a mask layout and the light-transmitting region of the another mask layout, which are exchanged with each other, correspond to the same probe cell.

17. The method of claim 16, wherein any one of synthesis target monomers is allocated to each of the mask layouts, and the light-blocking and light-transmitting regions are exchanged with each other between different mask layouts to which the same synthesis target monomer has been allocated, wherein an order of the synthesis target monomers allocated to the light-transmitting regions respectively corresponding to the probe cells remains unchanged before and after the exchange.

18. The method of claim 15, further comprising examining whether a desired target probe is in-situ synthesized using the mask layouts which comprise each mask layout whose light-blocking region is exchanged with a light-transmitting region.

* * * * *